March 27, 1956 R. L. DORT ET AL 2,739,436
MOWER HITCH DEVICE
Filed Oct. 1, 1954
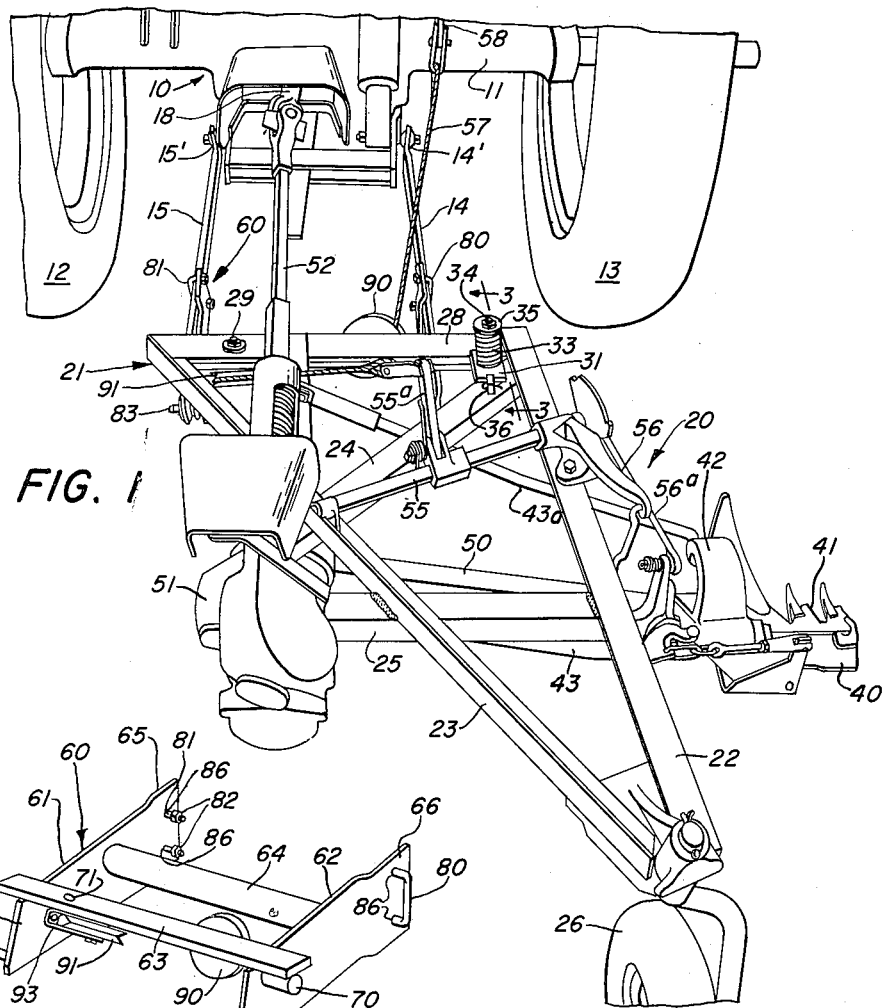
FIG. 1
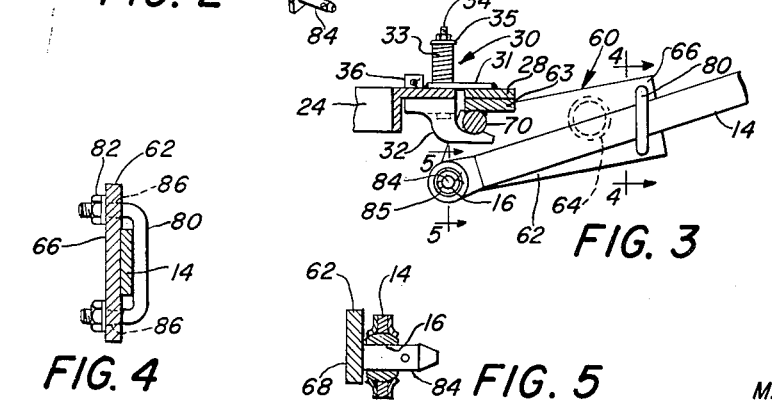
FIG. 2
FIG. 3
FIG. 4
FIG. 5
INVENTOR.
R. L. DORT &
M. W. KRASCHNEWSKI United States Patent Office 2,739,436
Patented Mar. 27, 1956

2,739,436

MOWER HITCH DEVICE

Russell L. Dort, Davenport, Iowa, and Melvin W. Kraschnewski, Geneseo, Ill., assignors to Deere & Company, Moline, Ill., a corporation of Illinois Application October 1, 1954, Serial No. 459,738

6 Claims. (Cl. 56—25)

The present invention relates generally to a hitch device for coupling a farm implement of the trailing type to a mobile pulling implement such as a tractor. More particularly, it refers to a hitch device for coupling a trailing break-back mower to a power-lift equipped tractor of the type having a pair of laterally spaced, rearwardly extending draft links that are laterally swingable about tractor-carried joints at their forward ends.

One of the objects of the invention is to provide a hitch device that is readily removable from and attachable to both the tractor and the mower and can easily be removed from one of the units without disassembling from the other unit.

Another object is to provide a hitch device that will rigidly interconnect the draft links so as to restrict lateral swinging of the links while attached to the hitch device.

A further object is to provide new and novel connecting means for securing the draft links to the hitch device that is simple, inexpensive to produce, and that can be easily attached and detached with a minimum of effort and without special tools.

Still a further object of this invention is to provide pulley means mounted on and as part of the hitch device which serves to redirect a power relay cable extending from the power lift on the tractor to the lift mechanism on the mower around obstructions on the hitch device and the mower.

Other objects and advantages of the invention will become readily apparent to one skilled in the art as the details of this device are described in conjunction with the accompanying drawings in which Fig. 1 is a perspective view taken from the rear and showing parts of the tractor, mower and hitch device.

Fig. 2 is a rear perspective of the hitch device.

Fig. 3 is a sectional view of the hitch device, a portion of the draft link, and the latch on the mower and taken along line 3—3 of Fig. 1.

Fig. 4 is an enlarged sectional view taken along line 4—4 of Fig. 3.

Fig. 5 is an enlarged sectional view taken along line 5—5 of Fig. 3.

For clarity of description the left and right portions and parts shall be referred to in the description as viewed from the rear of the assembly and looking forwardly or more specifically as shown in Figures 1 and 2. Likewise, front and rear directions shall be determined by designating the forward portions of the tractor as being the front of the assembly and the mower as being on the rear of the tractor.

Referring now to the drawings, the tractor is indicated in its entirety by reference numeral 10 and is of a conventional type having, as shown in Fig. 1, a laterally extending rear axle housing 11 carried on left- and right-hand traction wheels 12 and 13, respectively. The tractor is provided with two laterally spaced rearwardly extending draft links 14 and 15 suitably connected at their forward ends, by means such as ball joints 14′ and 15′, to normally permit free lateral swinging within limits.

Each of the draft links 14 and 15 is provided at its rear end with a transversely alined aperture. Only the aperture 16 on the right draft link 14 is visible as shown in Figures 3 and 5. A power take-off shaft 18 extends rearwardly from the axle housing 11.

The mower is indicated in its entirety by the reference numeral 20. A main frame 21 comprises a pair of angle iron members 22 and 23 which are suitably spaced apart at their forward ends and converge rearwardly, their rear ends being fixed to a caster wheel support member which receives the vertical spindle of a caster wheel 26. The frame members 22 and 23 are connected together by means of a front end portion or transverse bar 28, a diagonal brace bar 24, and a rear transverse bar 25, forming a rigid mower frame. A hole is cut through the left side of the transverse bar 28, for receiving a vertically disposed pivot bolt 29. On the opposite or right side of the mower frame is a releasable latch mechanism 30 comprising a cross piece 31 extending between and fixed to frame members 24, 28 and a latch member 32 disposed beneath the cross piece 31 and adapted to engage a complementary latch receiving member 70 fixed to the hitch device and which will be explained in detail later. The latch member 32 is pivoted at 36 and is yieldably supported by means of a spring 33 disposed on top of the cross piece 31 and embracing a bolt 34 which extends vertically through suitable openings in the cross piece 31 and latch member 32. The upper end of the spring bears against a retaining washer 35 carried by the bolt 34 and the lower end of the spring bears against the cross piece 31. The latch may be of any type. That shown here is similar to the latch in the U. S. patent to Coultas 2,225,156.

A cutter bar, indicated at 40, supports a reciprocating sickle 41 and is supported in turn on a shoe 42. The shoe 42 is connected to the mower frame by a conventional drag bar 43 and rod or brace 43a. The sickle 41 is slidably supported on the cutter bar 40 for reciprocating motion and is operated by a pitman 50 with which it is pivotally connected at one end. The other end of the pitman 50 is journaled on a crankshaft, not shown, which is journaled in and extends forwardly of a drive housing 51. The drive housing 51 is mounted on the frame members 24 and 25 and encloses suitable power transmitting means including a forwardly extending driving shaft 52 for rotating the above mentioned crankshaft and thereby driving the pitman 50. The driving shaft 52 is conventionally driven from the power take-off shaft 18 on the tractor through articulate connections thereto, which details are not unlike those in the U. S. patent to Coultas 1,946,541.

The cutter bar 40 is raised or lowered relative to the mower frame 21 by a lift mechanism on the mower that is actuated by the power lift on the tractor represented by a power lift cable 57. The lift mechanism on the mower comprises basically a square section rockshaft member 55 having fixed thereon a rearwardly extending lift member 56 that has a rear end connected to a vertically extending link 56a that is also connected to the vertically adjustable cutter bar. Also rigid on the rockshaft 55 and extending upwardly therefrom is a lever arm 55a which has at its free end suitable receiving means connected to the power lift cable 57 which as previously mentioned is controlled by a power-lift arm 58 on the tractor.

A hitch device 60, shown in its entirety in Fig. 2, comprises a pair of longitudinally extending transversely spaced apart arms 61 and 62 rigidly held apart by a laterally extending framework including a tubular member 64 and a laterally extending bar 63 and fastening means mounted on the arms for connecting each of the arms to a respective tractor drawbar link and the mower.

Specifically, there is a left arm 61 having a front portion 65 and a rear portion 67 and a right arm 62 having a front portion 66 and a rear portion 68. The left arm 61 is positioned adjacent to and inwardly of the left-hand draft link 15 and the right arm 62 lies adjacent to and inwardly of the right draft link 14.

The fastening means are made up of front and rear connecting means mounted on each arm for connecting the arm to its respective draft link. The front connecting means comprises gripping elements here in the form of U-bolts 80 and 81 which extend from the respective front portions 65, 66 of the arms 61 and 62 and grip the draft links 14 and 15 in the bight of the U. The legs of the U-bolts extend inwardly and pass through respective pairs of vertically spaced apart U-bolt receiving apertures 86 in the front portions of the arms. Nuts 82 on the U-bolts serve as adjustable means for varying the gripping pressure of the U-bolts on the draft links. The rear portions 67 and 68 of the arms 61 and 62 respectively have outwardly extending pintle members 83 and 84 projecting through the respective apertures at the rear end of the draft links 14, 15. Cotter pins 85 are provided to lock the links on the respective pintles, and thus serve in conjunction with the pintles, as the rear connecting means. As can be seen from reviewing the drawings, the front connecting means serve to releasably but fixedly secure the draft links to the hitch device to substantially eliminate lateral swinging of the draft links relative to the tractor and also to prevent vertical swinging of the arms about the laterally extending pintles.

The laterally extending bar 63 which connects the arms 61 and 62 has pivot means here shown as a hole 71 in one end thereof that receives the pivot bolt 29 extending through the holes thus serving to establish an axis for break-back swinging of the mower. On the opposite or right end of the transverse hitch bar 63 is the complementary latch member 70 in the form of a short circular bar or stud fixed to the under side of the bar 63. The complementary latch member 70 is disposed to cooperate with the latch member 32 on the mower.

Also mounted on and comprising part of the hitch device are power transmitting or pulley means in the form of a first pulley 90 mounted on the right arm 62 and a second pulley 91 mounted on the left arm 61. The pulleys 90 and 91 are suitably supported on the respective arms by respective U-brackets as represented by reference numeral 93. The pulleys 90 and 91 are provided to thread and redirect the power-lift cable 57 so as to relay power from the power lift arm 58 on the tractor to the rockshaft 55.

The hitch device is connected to the tractor by projecting the laterally extending pins or pintles 83 and 84 at the rear of the arms 61 and 62 through their associated apertures in the rear end of the draft links 14 and 15. The cotter pins 85 are utilized to prevent the draft links from slipping off the pintles. The gripping elements or U-bolts 80 and 81 are passed around the draft links at a position forward of the apertures and pass through the U-bolt holes cut in the forward portion of the arms 61 and 62. The nuts 82 and then tightened to releasably but fixedly secure the arms 61 and 62 to the respective draft links 14 and 15 so as to eliminate lateral swinging of the draft links relative to the tractor and to prevent vertical swinging of the arms 61, 62 about the laterally extending pintles 83, 84.

The mower frame is normally held in the position shown in Fig. 1 by the latch mechanism 30 and the vertically disposed pivot bolt 29. Should the cutter bar strike an obstruction the latch spring 33 will compress and permit the latch member 32 to be released from the complementary latch member 70 on the hitch device to allow the cutter bar to swing rearwardly about the pivot bolt 29. However, under stress of normal mowing operation the latch spring 33 is sufficient to hold the latch members 32 and 70 in engagement.

When the mower is not attached to the tractor, the hitch device may be left attached either to the tractor or the mower whichever is desired or can, of course, be removed entirely from both. A special feature of the hitch device exists in the fact that the pivot bolt 29, and latch members 32, 70 which connect the hitch device to the mower are independent and sufficiently spaced from the fastening means which secure the draft links 14, 15 to the hitch device 60 so as to prevent interference of the draft links 14, 15 with the latch members and pivot bolt when the hitch device is being attached to or removed from the tractor and/or the mower.

What is claimed is:

1. A hitch device for coupling a break-back mower to a power-lift-equipped tractor of the type having a pair of laterally spaced and rearwardly extending draft links having transversely alined apertures at their rear ends and normally freely swingable laterally within limits, and wherein the mower has a frame provided at one side of a front end portion with a vertical pivot and at the other side with a releasable latch, said hitch device comprising: a pair of longitudinally extending, transversely spaced apart arms, each having front and rear portions and rigidly held apart by laterally extending framework, each of said arms being positioned adjacent to a respective draft link; fastening means mounted on each arm for connecting said arm to its respective draft link; pivot means on the laterally extending framework for receiving the mower pivot to establish an axis for break-back swinging of the mower; and latch receiving means mounted on the framework cooperative with the latch on the mower to releasably secure said other side to the framework.

2. The invention defined in claim 1, further characterized by said fastening means comprising front and rear connecting means; said rear connecting means comprising laterally extending pins fixed respectively to the rear portion of the arms and projecting respectively through the apertures in the rear ends of the draft links, said front connecting means comprising gripping elements releasably but fixedly securing said arms respectively to said links to eliminate lateral swinging of the draft links relative to the tractor and to prevent vertical swinging of the arms about said laterally extending pins.

3. The invention defined in claim 2, further characterized by said gripping means being in the form of U-bolts mounted respectively on the front portion of each of said arms and gripping the respective adjacent draft link in the bight of the U-bolt, and adjustable means on said U-bolts for varying the gripping pressure of the U-bolts on the draft links.

4. A hitch device for coupling a break-back mower to a power-lift-equipped tractor of the type having a pair of laterally spaced and rearwardly extending draft links having transversely alined apertures at their rear ends and normally freely swingable laterally within limits, and wherein the mower has a vertically adjustable mower part and a frame provided at one side thereof with a vertical pivot and at the other side with a releasable latch and further including a rockable lift member connected to the vertically adjustable mower part, said hitch device comprising: pair of longitudinally extending, transversely spaced apart arms, each having front and rear portions and rigidly held apart by framework including a laterally extending bar, each of said arms being positioned adjacent to a respective draft link; a fastening means mounted on each arm for connecting said arm to its respective draft link; pivot means adjacent to one end of the laterally extending bar for receiving the mower pivot to establish an axis for break-back swinging of the mower; latch receiving means mounted on said bar and adjacent to the other end thereof for cooperation with the releasable latch of the mower; and power transmitting means mounted on and as part of the device for relaying power from the power lift on the tractor to said rockable lift member.

5. A hitch device for coupling a break-back mower to a power-lift-equipped tractor of the type having a pair of laterally spaced and rearwardly extending draft links having transversely alined apertures at their rear ends and normally freely swingable laterally within limits, and wherein the mower has a frame provided at one side of a front end portion with a vertical pivot and at the other side with a releasable latch and further including a rockable lift member connected to a vertically adjustable mower part, said rockable member being actuated by a cable extending from the power lift to the member, said hitch device comprising: a pair of longitudinally extending, transversely spaced apart arms, each having front and rear portions and rigidly held apart by framework including a laterally extending bar, each of said arms being positioned adjacent to a respective draft link; fastening means mounted on each arm for connecting said arm to its respective draft link; pivot means adjacent to one end of the laterally extending bar for receiving the mower pivot to establish an axis for break-back swinging of the mower; latch receiving means mounted on said bar and adjacent to the other end thereof for cooperation with the releasable latch of the mower; and pulley means mounted on and as part of the hitch device to thread and redirect the cable for relaying power from the power lift to the rockable lift member.

6. A hitch device for coupling a break-back mower to a power-lift equipped tractor of the type having a pair of laterally spaced and rearwardly extending draft links having transversely aligned apertures at their rear ends and normally freely swingable laterally within limits, and wherein the mower has a frame provided at one side of a front end portion with a vertical pivot and at the other side with a releasable latch, said hitch device comprising: a pair of longitudinally extending transversely spaced apart arms, each having front and rear portions and each being positioned adjacent to a respective draft link and having vertically spaced U-bolt receiving apertures in the front portion thereof; U-bolts gripping the respective adjacent draft link in the bight of the U-bolt, the legs of said U-bolts passing through said U-bolt receiving apertures in the front portion of the arms; adjustable tightening means mounted on said U-bolts for varying the gripping pressure of the U-bolts on the draft arm; pintle members extending laterally from the rear portion of the arms and projecting through the apertures at the rear end of the draft links; laterally extending framework fixed to the arms having an opening therein adapted to receive the vertical pivot to permit lateral swinging of the mower relative to the bar about said pivot; latch receiving means mounted on the framework proximate to the rear portion of one of said arms and spaced from the pivot receiving opening, said latch receiving means being cooperative with the releasable latch for preventing lateral swinging of the mower relative to the tractor, said U-bolt receiving apertures and said pintles being so disposed to cause the positioning of the hitch device relative to the draft links to be such as to permit removal or attachment of the hitch device without interference between the latch and the draft links.

References Cited in the file of this patent

UNITED STATES PATENTS

| | | |
|---|---|---|
| 2,467,530 | Johnson | Apr. 19, 1949 |
| 2,653,824 | Frevik | Sept. 29, 1953 |